(12) United States Patent
Bourdrez et al.

(10) Patent No.: US 10,180,378 B2
(45) Date of Patent: Jan. 15, 2019

(54) MODELLING OF FRICTIONS IN A POWER STEERING SYSTEM USING A SCATTER OF POINTS

(71) Applicant: JTEKT EUROPE, Irigny (FR)

(72) Inventors: Sébastien Bourdrez, Yzeron (FR); Pascal Moulaire, La Tour de Salvagny (FR); Christophe Ravier, Saint Pierre de Chandieu (FR)

(73) Assignee: JTEKT EUROPE, Irigny (FR)

( * ) Notice: Subject to any disclaimer, the term of this patent is extended or adjusted under 35 U.S.C. 154(b) by 213 days.

(21) Appl. No.: 15/124,260

(22) PCT Filed: Mar. 9, 2015

(86) PCT No.: PCT/FR2015/050572
§ 371 (c)(1),
(2) Date: Sep. 7, 2016

(87) PCT Pub. No.: WO2015/140447
PCT Pub. Date: Sep. 24, 2015

(65) Prior Publication Data
US 2017/0023445 A1     Jan. 26, 2017

(30) Foreign Application Priority Data
Mar. 18, 2014   (FR) ..................... 14 52216

(51) Int. Cl.
*B62D 5/04* (2006.01)
*G01M 17/06* (2006.01)
(Continued)

(52) U.S. Cl.
CPC ........... *G01M 17/06* (2013.01); *B62D 5/0463* (2013.01); *B62D 5/0481* (2013.01); *G01L 3/22* (2013.01); *G01L 5/22* (2013.01)

(58) Field of Classification Search
CPC . G01M 17/06; G01L 3/22; G01L 5/22; B62D 5/0481; B62D 5/0463
See application file for complete search history.

(56) References Cited

U.S. PATENT DOCUMENTS 9,751,557 B2 *   9/2017   Svensson ............... B62D 6/008
2005/0187672 A1 *   8/2005   Fangeat .............. B60T 8/17551
701/1
(Continued)

FOREIGN PATENT DOCUMENTS

DE         102 06 474 A1      8/2003
DE    10 2008 021 848 A1     11/2009
(Continued)

OTHER PUBLICATIONS

May 29, 2015 International Search Report issued in International Patent Application No. PCT/FR2015/050572.

*Primary Examiner* — Alan D Hutchinson
(74) *Attorney, Agent, or Firm* — Oliff PLC

(57) ABSTRACT

A method for evaluating the frictions in a power steering mechanism, the method including a step of acquiring a series of characterization points, during which are measured, for several different values taken successively by the assistance force during the operation of the steering mechanism, the corresponding friction values, so as to empirically obtain a series of distinct characterization points each associating a measured friction value to a measured value representative of the assistance force, then a step of constructing an empirical friction model, during which a correlation law is established between the characterization points constitutive of the series of characterization points, from the scatter chart formed by the series of the characterization points.

13 Claims, 1 Drawing Sheet

(51) Int. Cl.
*G01L 5/22* (2006.01)
*G01L 3/22* (2006.01)

(56) References Cited

U.S. PATENT DOCUMENTS

2008/0162001 A1* 7/2008 Chai .................. B62D 5/006
 701/42
2010/0256870 A1* 10/2010 Klein .................. B62D 5/0481
 701/41

FOREIGN PATENT DOCUMENTS

EP 2 239 180 A2 10/2010
WO 2009/133534 A2 11/2009

* cited by examiner

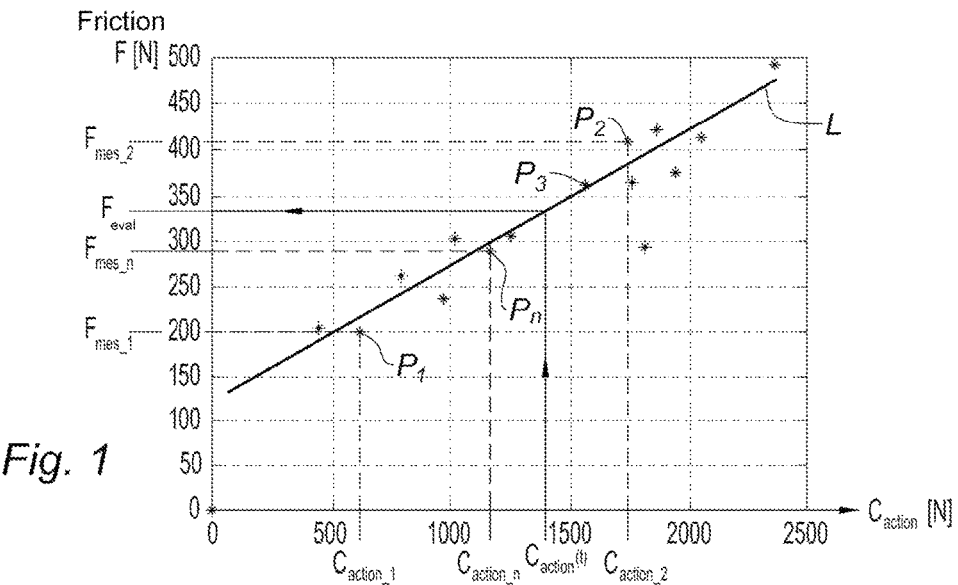
Fig. 1
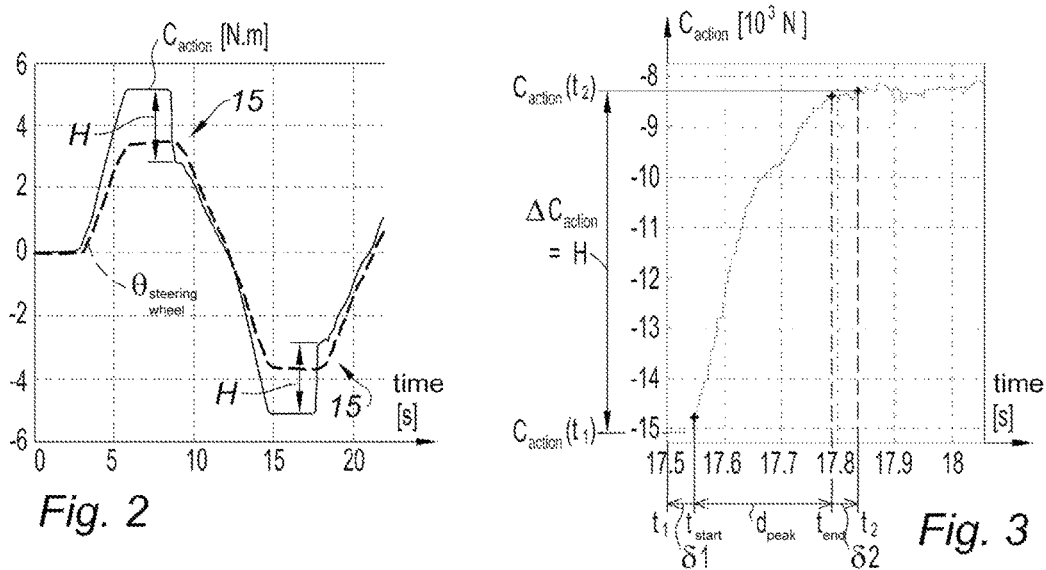
Fig. 2
Fig. 3
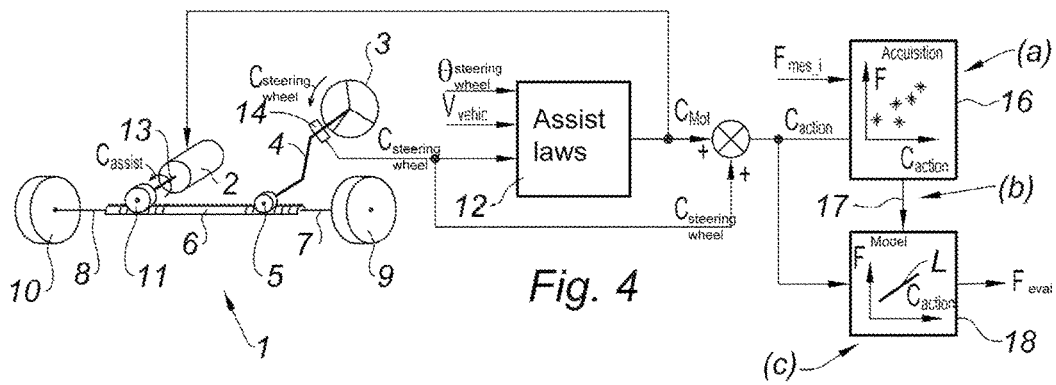
Fig. 4

MODELLING OF FRICTIONS IN A POWER STEERING SYSTEM USING A SCATTER OF POINTS

The present invention concerns the general field of methods for managing power steering systems equipping vehicles, and in particular motor vehicles.

More particularly, the invention concerns taking into the consideration the friction forces in a power steering mechanism.

The presence, in a steering mechanism, of mechanical frictions between the members constitutive of said steering mechanism, may affect the relative movements of said members, disturb the power steering control, and cause parasitic phenomena at the steering wheel.

Hence, it may be useful to detect and quantify these inner frictions, specific to the steering mechanism, in order for example to compensate said frictions in view of improving the driving comfort and/or providing the driver with a faithful and intuitive feeling of the reactions of the steering system.

However, it is particularly difficult to accurately determine the frictions, and this all the more as said frictions evolve over time, depending in particular on the ageing or on the degree of wear of the steering members, or depending on the surrounding conditions of use of the vehicle (it will be understood, for example, that the friction tends to increase under cold weather, in particular because of the increase of viscosity of the lubricants).

Consequently, the objects assigned to the invention aim at overcoming the aforementioned drawbacks and providing a new method for evaluating frictions which enables determining in an accurate, simple manner, with a high reliability, and at any moment, the frictions that affect a power steering, and this, for a wide range of life situations of the steering mechanism.

The objects assigned to the invention are reached by means of a method for evaluating the frictions in a power steering mechanism equipped with an assist motor intended to provide an assistance force for maneuvering said steering mechanism, said method being characterized in that it includes a step (a) of acquiring a series of characterization points, during which, for several different values taken successively by the assistance force during the operation of the steering mechanism, the corresponding friction values are measured in order to empirically obtain a series of distinct characterization points each associating a measured friction value to a measured value representative of the assistance force, then a step (b) of constructing an empirical friction model, during which a correlation law is established between the characterization points constitutive of the series of characterization points, from the scatter chart formed by said series of said characterization points.

Advantageously, by constructing a friction model from a plurality (a scatter chart) of distinct experimental characterization points, collected at several different values of the assistance force, the invention enables realizing a complete and faithful mapping of the friction phenomenon, which covers, in a reliable manner, a wide range of assistance forces, and therefore, more generally, a wide range of life situations of the steering mechanism (life situations which herein are characterized by the assistance force applied at the considered instant).

Advantageously, the invention allows taking, simultaneously, into consideration, in order to establish the friction model applicable at a considered instant, a set of several characterization points each being obtained by measurement, and all of which are therefore actually representative of the actual behavior of the frictions in the steering over a considered period of time that immediately precedes the instant at which it is desired to estimate the friction.

The multiplicity of the used characterization points, and more particularly, the spreading (the distribution) of these characterization points over a wide range of assistance force values, guarantees the representativeness and the validity of the model, at least over said wide distribution range, and even beyond (by extrapolation), that is to say that it guarantees the reliability and the correctness of said model over a wide range of life situations of the steering mechanism.

Furthermore, this multiplicity of the characterization points allows defining the correlation law from redundant data, thus making the definition of the correlation law, and therefore the definition of the model resulting therefrom, less sensitive to the noise and to the measurement errors which are likely to affect the determination of either of the characterization points.

Hence, the definition of the model according to the invention is particularly robust.

In addition, the experimental (empirical) nature of the construction of the model according to the invention, which minimizes the risks of errors (of deviation) between the actual friction and the friction estimated from said model, advantageously guarantees that said model is very representative of (very close to) the actual behavior of the steering mechanism.

Furthermore, besides the acquisition of the series of characterization points, the invention makes it possible to refresh said series of characterization points at any instant, which enables having at any instant a refreshed scatter chart of experimental characterization points, so that the invention allows guaranteeing the representativeness of the friction model durably over time.

In other words, the invention advantageously allows automatically and intrinsically integrating to the construction of the model, over time, the effects of ageing or of wearing of the steering mechanism, as well as the fluctuations of the external conditions (for example of temperature) affecting the operation of said mechanism, thus making it possible to adapt said model substantially in real-time, so that said model permanently reflects the actual behavior of the steering mechanism.

From the empirical model thus constructed, and preferably updated on a regular basis, it is possible to estimate in a realistic manner, and at any instant, the friction from a known (measured) value of the actuation force.

For all the aforementioned reasons, the invention advantageously enhances the reliability of estimating the inner frictions of the steering, in particular because the invention eliminates, by an experimental construction of the model which is spread out both in space (over a range of assistance force values) and in time (over a duration which is necessary for acquiring all points of the series of the characterization points, and which, thanks to the refreshing, may remain almost contemporary to the instant at which the model is used to estimate a friction), the approximation errors which would necessarily mar a purely theoretical friction model wherein the calibration thereof would be based entirely on one single instantaneous measurement point.

Other objects, features and advantages of the invention will appear in more details on reading the description which follows, as well as with reference to the appended drawings, provided only for an illustrative and non-restrictive purpose, among which:

FIG. 1 illustrates, on a diagram which expresses the friction (on the ordinate) depending on a variable (on the abscissa) representative of the assistance force, and more particularly depending on the total actuation force corresponding to the sum of the assistance force output by the motor and of the manual force exerted by the driver on the steering wheel, an example of a scatter chart of characterization points obtained according to the invention, as well as a corresponding correlation law, established in accordance with the invention.

FIG. 2 represents, on a time diagram, the evolution of a signal representative of the assistance force and the joint evolution of a signal representative of the angular position of the steering wheel, in order to illustrate the drop principle of the value representative of the assistance force which is observed during steering reversals.

FIG. 3 is an enlarged detail view of a portion of FIG. 2.

FIG. 4 schematically represents the implementation of a method in accordance with the invention.

The invention concerns a method for evaluating the frictions in a power steering mechanism 1.

Said power steering mechanism 1 is equipped with an assist motor 2 intended to provide an assistance force $C_{assist}$ for maneuvering said steering mechanism.

It is possible to consider indifferently any type of assist motor 2, and more particularly any type of bi-directional assist motor.

In particular, the invention may be applied to a rotary assist motor 2, intended to exert a torque-type assistance force $C_{assist}$, as well as to a linear assist motor 2, intended to exert a traction or compression type assistance force $C_{assist}$.

Furthermore, said assist motor 2 may be for example hydraulic, or preferably, electric (since the use of an electric motor facilitates in particular implantating and implementing said motor, as well as generating and managing the useful signals).

In a particularly preferred manner, the assist motor 2 will be a rotary electric motor, for example of the «brushless» type.

Furthermore, the power steering mechanism 1 preferably comprises, in a manner known per se, a steering wheel 3 by which the driver of the vehicle can drive in rotation a steering column 4 which engages, by means of a pinion 5, a steering rack 6 slidingly mounted in a steering casing secured to the chassis of the vehicle.

Each of the ends of the steering rack 6 is preferably connected, via a steering rod 7, 8, to a yaw steerable stub axle, on which a steered wheel (and preferably also driving wheel) 9, 10 of the vehicle is mounted, so that the displacement of the rack 6 in translation in the casing causes a modification of the steering angle (i.e. the yaw orientation) of said steered wheels 9, 10.

The assist motor 2 may engage on the steering column 4, for example via a wormwheel and worm reducer, or may engage directly on the steering column 6, by a ball screw type driving mechanism or via a driving pinion 11 distinct from the pinion 5 of the steering column (thus forming a "dual pinion" steering mechanism, as schematized in FIG. 4).

The force setpoint (or, more preferably, the torque setpoint) $C_{Mot}$ which is applied to the assist motor 2 so that said motor assists the driver in maneuvering the steering mechanism 1 depends on predetermined assistance laws, stored in a non-volatile memory of a calculator (herein an assistance laws application module 12), said assistance laws being capable of adjusting the force setpoint $C_{Mot}$ based on various parameters such as the steering wheel torque $C_{steering\_wheel}$ exerted by the driver on the steering wheel 3, the (longitudinal) speed $V_{vehic}$ of the vehicle, the angular position $\theta_{steering\_wheel}$ of the steering wheel 3, etc.

According to the invention, the method includes a step (a) of acquiring a series of characterization points $P_1, P_2, \ldots P_n$, during which are measured, for several different values taken successively by the assistance force $C_{assist}$ during the operation of the steering mechanism, the corresponding friction values, so as to empirically obtain a series of distinct characterization points $P_1, P_2, \ldots P_n$ each associating a measured friction value $F_{mes\_1}, F_{mes\_2}, \ldots F_{mes\_n}$, to a measured value $C_{action\_1}, C_{action\_2}, \ldots C_{action\_n}$ representative of the assistance force, as it is illustrated in FIG. 1.

In other words, a series of n characterization points is acquired, such that, for i an integer ranging from 1 to n: $Pi=(C_{action\_i}, F_{mes\_i})$, wherein the index i=1 to n herein indicates, by mere convention, the chronological order of acquisition of said characterization points.

Advantageously, the invention allows acquiring, through measurement, a plurality of characterization points $P_1, P_2, \ldots P_n$ which are distributed over a whole range of force values.

This range (not limited to one single value) covers several values representative of the assistance force, and therefore covers, more generally, different possible states of the steering mechanism 1, and in particular different stress states of the steering mechanism 1 relating to the (voluntary) maneuvering of said steering mechanism, states to which different inner friction levels are respectively associated.

Hence, the invention provides a wide interval for defining the friction model, within which interval (and if appropriate in the vicinity of which) the definition of the model will be particularly reliable, since said definition is framed by measured experimental values, representative of the actual behavior of the steering mechanism.

In absolute terms, it is possible to choose as a first variable for defining the characterization points (that is to say, in FIG. 1, as the abscissa variable), called «representative of the assistance force $C_{assist}$», any parameter which reflects a state of the steering mechanism which can be correlated, in a deterministic manner, with the magnitude of the inner frictions.

Indeed, the pursued objective, in fine, is to enable constructing a model capable of evaluating the frictions (the output data of the model) in reliable way, only by the knowledge of the value taken, at the considered instant, by this first variable (the input datum applied to the model).

In practice, the assistance force $C_{assist}$ output by the assist motor 2 is generally (very) higher than the force $C_{steering\_wheel}$ manually exerted by the driver on the steering wheel 3.

In order to ensure that the used first variable is actually representative of the stress state of the steering mechanism 1, we will therefore preferably ensure that said first variable takes into consideration (at least) the (prevailing) contribution of said assistance force $C_{assist}$ in the definition of the stress state of the steering mechanism.

Preferably, the measured value representative of the assistance force is selected among: the value of the motor torque setpoint $C_{Mot}$ which is applied to the assist motor 2, the measured value of the (electromagnetic) assist torque $C_{assist}$ actually exerted by the output shaft 13 of the assist motor, or, this corresponding to the preferred variant illustrated in FIG. 4, the measured value of the total actuation torque $C_{action}$ which corresponds to the sum (algebraic sum) on the one hand of the assist torque $C_{assist}$ output by the assist motor 2 and on the other hand of the steering wheel torque $C_{steering\ wheel}$ which is exerted by the driver on the steering wheel 3.

Indeed, these values have the double advantage of containing an information representative of the stress state of the steering mechanism 1 on the one hand, which stress state is related to the maneuvering (or to the intentional holding in position) of said steering mechanism, inasmuch as said values take in particular into consideration the contribution of the assistance force $C_{assist}$ provided by the assist motor, and on the other hand, the advantage of being available in the form of easily exploitable signals.

Thus, the value of the motor torque setpoint $C_{Mot}$ may be obtained as output of the assistance laws application module 12.

The electromagnetic assist torque $C_{assist}$ may be provided by an adequate torque sensor, preferably integrated into the controller of the assist motor.

The steering wheel torque $C_{steering\ wheel}$ may be obtained by an appropriate steering wheel torque sensor 14, such as a magnetic torque sensor measuring the elastic deformations of a torsion bar placed between the steering wheel 3 and the steering column 4.

In practice, it will be highlighted that, in the life situations considered for the vehicle, the value of the setpoint $C_{Mot}$ applied to the assist motor 2, and the value of the assistance force $C_{assist}$ which is actually provided by said assist motor 2, are extremely close, or even equal, one to the other, so that these two signals may be used in an equivalent manner in the context of the invention (including, in particular, for defining the total actuation torque $C_{action}$).

This is why, preferably, and for convenience of description, it is possible to assimilate, in the following, the signal of the assistance force (torque) $C_{assist}$ output by the assist motor with the force setpoint (torque setpoint) $C_{Mot}$ applied to the assist motor 2.

Furthermore, the inventors have noticed that the magnitude of the frictions was in particular related to, and more particularly determinable based on, the magnitude of the total actuation force $C_{action}$ which is exerted on the steering mechanism 1 in order to maneuver said mechanism (and therefore steer the vehicle), wherein said actuation force $C_{action}$ herein corresponds to the sum (the algebraic sum) of the assistance force (and more particularly the assist torque) $C_{assist}$ output by the assist motor 2 and of the steering wheel force (and more particularly the steering wheel torque) $C_{steering\ wheel}$ which is exerted by the driver on the steering wheel 3.

More particularly, the inventors have noticed that the magnitude of the inner frictions represents an increasing function of said actuation force $C_{action}$, an increasing function whose slope is related to the mechanical efficiencies.

The choice of the actuation force $C_{action}$ as the first variable characteristic of the characterization points, and more generally as the input variable of the model, that is to say as the variable representative of the state of the steering mechanism, is therefore relevant.

Furthermore, in order to obtain a modeling of the friction phenomenon which affects the steering mechanism, and therefore an evaluation of the friction phenomenon which is as accurate and as complete as possible, it is preferable to use, as a value representative of the state of the steering mechanism, and therefore as a measured value representative of the assistance force $C_{action\_1}$, $C_{action\_2}$, ... $C_{action\_n}$, a force signal which encompasses effects of the frictions in a kinematic linkage which is as long and as comprehensive as possible, within the steering mechanism 1, and this in order to take into consideration as many segments as possible of the steering system in which frictions may arise, and therefore neglect as few sources of inner friction as possible.

In other terms, it is preferable to collect the useful signal(s) of forces in areas that are located as far upstream as possible of each kinematik linkage that is comprised between an upstream-located, actuating element of the steering system on the one hand (namely the driver and the assist motor 2 respectively), and the downstream-located effecting members (the rods 7, 8 and the steered wheels 9, 10) on the other hand, so that these signals encompass as much frictions as possible which oppose the maneuvering of the steering, and in this case encompass all the frictions which arise in the entire kinematic linkage located downstream of the considered actuating element(s).

Furthermore, it is also preferable to take into consideration a force signal which takes into account not only the contribution of the assist motor 2, but also the manual contribution of the driver, so that said force signal is representative of the state (and therefore of the friction level) of the entire steering mechanism 1, both in the "motor-driven" portion of said mechanism (the assist motor 2, the reducer, the rack 6 . . . ) and in (all or part of) the "manually-driven" portion, also called the "driver" portion, of said mechanism (the steering wheel 3, the steering column 4, the pinion 5/rack 6 connection . . . ).

For these reasons, the used force signal (as a «first variable» in the sense described above) will be preferably, and judiciously, the actuation force $C_{action}$ signal formed, as it is illustrated in FIG. 4, by the sum on the one hand of the steering wheel torque signal representative of the steering wheel torque $C_{steering\ wheel}$ exerted by the driver on the steering wheel, and on the other hand of the motor torque setpoint $C_{Mot}$ signal (considered as equal to the assistance force $C_{assist}$, as indicated hereinabove).

In this respect, it will be noted that, in this case, by measuring the steering wheel torque $C_{steering\ wheel}$ by means of the aforementioned torque sensor 14, one can advantageously take into consideration, regarding the "manually-driven" portion of the steering mechanism 1, all the frictions appearing downstream of said sensor 14 (and more particularly downstream of the torsion bar thereof), and in particular the frictions which arise in the connection between the rack 6 and the pinion 5 secured to the lower section of the steering column.

Furthermore, it will be noted that, by taking into account, if appropriate, the driving ratio between the assist motor 2 and the steering rack 6, it is possible to indifferently express the forces signals, and in particular the actuation force signal $C_{action}$ or the motor torque setpoint signal $C_{Mot}$, in the form of a (motor) torque as well as in the form of an equivalent linear (rack 6) force, without modifying the general principle of the invention.

Thus, as example, the actuation force signal $C_{action}$ is homogeneous to a torque (expressed in N·m) in FIG. 2, and may be converted, for convenience and by mere conventional representation, in the form of an equivalent linear force, expressed in Newtons (FIG. 1), and/or, for example, in kilo-Newtons (FIG. 3).

More generally, the invention may indifferently use signals or measurements representative of linear forces (acting in translation) or representative of torques (acting in rotation).

As illustrated in FIG. 1, the series of characterization points $P_1$, $P_2$, . . . $P_n$ may be advantageously classified, and/or more particularly graphically represented, in the form of a scatter chart.

To this end, all it needs is to place said characterization points $P_1, P_2, \ldots P_n$ in a two-dimensional graph, with the friction F plotted on the ordinate, and on the abscissa the first variable, representative of the stress state of the steering mechanism 1.

More particularly, in the present case, the abscissa will correspond to the actuation force $C_{action}$, which, in turn, is a quantity that depends on and is representative of, the assistance force $C_{assist}$, $C_{mot}$.

Subsequently to the step (a) of acquiring a series of characterization points, the method includes a step (b) of constructing an empirical friction model, during which a correlation law L is established between the characterization points $P_1, P_2, \ldots P_n$ constitutive of the series of characterization points, from the scatter chart formed by said series of said characterization points.

Advantageously, because the series of characterization points $P_1, P_2, \ldots P_n$ is considered in its entirety, as a scatter chart of experimental measurement points, in order to deduce a correlation law L therefrom, said correlation law L is based, at the instant when said correlation law is established, simultaneously on several characterization points, that is to say on a plurality of empirical values, which faithfully reflect the actual behavior of the steering mechanism.

Furthermore, the acquisition of the characterization points $P_1, P_2, \ldots P_n$ has spread out over time, during the period which has preceded the instant when the correlation law L is defined from said characterization points, so that, by construction, said correlation law L takes perfectly into account the (recent) history of the steering mechanism for determining a tendency of the evolution of the frictions based on the first variable (herein, based on the actuation force $C_{action}$).

Thus, the invention allows obtaining a correlation law, and therefore a friction model, particularly reliable and close to reality.

Once the correlation law L is established, it is possible to use said law as a predictive model, generalized and valid beyond the sole characterization points $P_1, P_2, \ldots P_n$, for evaluating, at a considered instant t, the friction F, $F_{eval}$ which affects the maneuvering of the steering mechanism 1, only from the necessary and sufficient knowledge of any value of the first variable (herein, by the knowledge of any value of the actuation force $C_{action}$, measured from the motor torque setpoint control $C_{Mot}$ and from the steering wheel torque $C_{steering\ wheel}$).

Preferably, the correlation law L is established in the form of an interpolation curve or a regression curve with reference to the series of characterization points $P_1, P_2, \ldots P_n$.

Said interpolation curve may be linear, polynomial, or of any other appropriate nature.

Preferably, and as illustrated in FIG. 1, the correlation law L is obtained by linear regression on the series of characterization points $P_1, P_2, \ldots P_n$, preferably by the least squares method.

This solution allows obtaining in a simple, rapid, and resource-efficient way, a perfectly valid friction model, largely satisfactory for the intended application.

In particular, the use of a linear function (straight line) type model, allows associating to any actuation force $C_{action}$ a corresponding (estimated) friction value $F_{eval}$, by means of a simple but nonetheless relatively accurate formula, and in this case according to an increasing linear function.

In a particularly preferred manner, the acquisition step (a) and the model construction step (b) are refreshed in an iterative manner during the operation of the steering mechanism, so that the correlation law L is redefined as new characterization points $P_1, P_2, \ldots P_n, P_{n+1} \ldots$ are acquired.

Advantageously, by providing on the one hand an acquisition of characterization points which is progressive, that is to say which spreads over several successive instants, and which is preferably permanent, that is to say that said acquisition is repeated and/or is completed during the entire duration of the operation of the steering mechanism 1, from the (most recent) start-up of the vehicle, and by adjusting on the other hand the correlation law L depending on the new characterization points, which are added or substituted to the previously acquired characterization points, the invention intrinsically takes into consideration, substantially in real-time, the evolutions of the life situation of the steering mechanism.

In other words, by constantly updating the correlation law L, substantially in real-time (as soon as the acquisition of one or several new characterization point(s) makes it possible), from a sample of characterization points $P_1, P_2, \ldots P_n$ which is incessantly refreshed, the method according to the invention allows a permanent and complete recalibration of the empirical model which therefore remains at any times faithfully and finely representative of the actual operating conditions of the vehicle.

As example, it will be understood that, in a start-up situation under cold weather, the frictions will be initially high, and will tend to decrease if a rise of the temperature of the steering mechanism, which may be in particular due to warming of the surrounding atmosphere and/or to heating of the (propulsion) engine of the vehicle, improves the fluidity of the lubricant used within said steering mechanism.

Advantageously, the invention will make it possible taking such evolutions into consideration, since the scatter chart obtained in the first situation (herein the cold start-up) is different, in its extent and/or its distribution, from the scatter chart obtained in the second situation (herein the hot operating condition), which leads to the establishment of correlation laws, derived respectively from said different scatter charts, that are not identical in each of said situations.

In general, the definition of the friction model provided by the invention turns out to be more flexible, reactive and polyvalent than a definition which would be based on a theoretical pre-established model, "rigid" or "fixed", that one would try to define, in a very approximate way, from one single calibration value.

Preferably, the acquisition of the series of characterization points is sliding rolling acquisition, so that, once the series has reached a predetermined maximum size n, the acquisition of one or several new characterization point(s) $P_{n+1}, P_{n+2}, \ldots P_{n+i}$ and the addition of these most recent characterization point(s) $P_{n+1}, P_{n+2}, \ldots P_{n+i}$ to the series causes the withdrawal of a corresponding number of the earliest characterization point(s) $P_1, P_2, \ldots P_i$ from said series.

In other terms, refreshing is accompanied with progressively substituting the new characterization points $P_{n+1}, P_{n+2}, \ldots P_{n+i}$, for the earliest characterization points $P_1, P_2, \ldots P_i$.

Thus, while limiting the storage space and the calculation power necessary to the proper course of the method, it is possible to keep in consideration, for defining the friction model, only the most recent characterization points, and, on the contrary, to eliminate from the definition of the correlation law L the "obsolete" characterization points considered to be the least representative as they are the most distant in time from the considered (present) instant.

This rolling replacement, preferably with a constant sample size (series size), of the empirical data (the characterization points) on which the construction of the friction model is based advantageously allows for an effective and permanent updating of said model, thus enhancing the robustness and reliability thereof.

Preferably, the characterization points are acquired during steering reversals 15, that is to say when the driver of the vehicle (voluntarily) changes the direction in which he actuates the steering wheel 3, this change aiming at switching from a left-steering situation, in which the driver exerts a force which pulls the steering wheel to the left, into a right-steering situation, in which the driver exerts a force which pulls the steering wheel to the right, or vice versa.

Indeed, any steering reversal 15 causes a switch (a reversal) of the direction of displacement of the (movable) members of the steering system.

Now, in practice, the resistant forces due to frictions inner to the steering mechanism, which tend to oppose the steering maneuver, have their sign opposite to the sign of the displacement (and more particularly the sign of the displacement speed) of the members of the steering.

Switching the direction of maneuvering of the steering, and therefore switching the direction of displacement of the members of the steering, therefore causes almost simultaneously, on the one hand, the disappearance of a first resistant force component, attributable to the frictions which have opposed, prior to the steering reversal 15, the displacement of the members of the steering in the first direction (conventionally, to the left), and on the other hand, the appearance of a new (second) resistant force component, also attributable to the frictions, but having a sign that is opposite to the sign of the first resistant force component, and which opposes this time, subsequently to the steering reversal 15, the displacement of the members of the steering in the second direction (to the right) opposite to the first direction.

The presence of frictions, and more particularly the reversal of the action direction of the frictions when inverting the steering direction 15, is therefore at the origin of a hysteresis phenomenon which results, when inverting the steering direction, into a drop, in absolute value, of the resistant force, and consequently into a drop, in absolute value, of the assistance force $C_{assist}$ which is output by the assist motor (and more generally into a drop of the actuation force $C_{action}$ which is applied to the steering mechanism) for counteracting (and overcoming) said resistant force.

In FIGS. 2 and 3, this drop of the actuation force $C_{action}$ presents a height denoted as H.

In FIG. 2, one can clearly observe that the drop H (in absolute value) of the actuation force $C_{action}$ coincides in time with the steering reversals 15, as they come out from the dashed curve which illustrates the evolution of the angular position $\theta_{steering\ wheel}$ of the steering wheel over time, thereby highlighting the alternations of the direction of rotation of said steering wheel, when the driver successively steers the vehicle, in the illustrated example, to the right, and then to the left.

It will be noted that, in the example of FIG. 2, the angular position $\theta_{steering\ wheel}$ of the steering wheel, representative of the steering configuration of the steering, is actually expressed, in an equivalent manner, from the angular position of the shaft 13 of the assist motor 2, which may be determined for example by an adequate sensor, of the resolver type.

In the example of FIG. 2, the mechanical reduction ratio of the kinematic linkage which links the shaft 13 of the assist motor to the steering wheel 3 is about 26, and the angle scale plotted on the ordinate axis corresponds to mechanical kilo-degrees ($10^3$ degrees) of the motor shaft. The illustrated reciprocating movements of the motor shaft herein alternate between about −3600 degrees (of motor shaft angle) and about +3600 degrees (of motor shaft angle), which corresponds to angular displacements of the steering wheel of about +/−139 degrees.

According to a possible implementation, it is possible to detect the steering reversals 15 by evaluating the time derivative of the signal representative of the actuation force (or any other signal affected by the friction and therefore subjected to a notable drop in the case of a steering reversal, such as the motor torque setpoint signal $C_{Mot}$): $\partial C_{action}/\partial t$, and then by comparing the value of said time derivative with a predetermined variation threshold $S_{peak}$, in order to detect a derivative peak, higher than said variation threshold $S_{peak}$.

Indeed, such a derivative peak, higher than said predetermined variation threshold, indicates a transition corresponding to a rapid variation (possibly a quasi-discontinuity) of the considered signal, and more particularly, to a drop (the value coming down closer to zero), in absolute value, of said considered signal, and may therefore indicate an reversal of the steering 15 direction.

In practice, it is possible to apply any derivation method allowing determining the variation of the chosen signal per a unit of time (that is to say the slope of the curve representative of said signal), in this case between two instants separated by a sufficiently small predetermined time interval (sampling period).

As an indication, the sampling period (also called sampling «step») may be comprised between 0.5 ms and 10 ms.

Preferably, the measurement of the friction $F_{mes\_1}$, $F_{mes\_2}$, ... $F_{mes\_n}$ at the characterization points $P_1$, $P_2$, ... $P_n$ is obtained from the drop height H of a signal representative of the assistance force $C_{assist}$ output by the assist motor 2, or, preferably, from the drop height H of a signal representative of a total actuation force (torque) $C_{action}$ corresponding to the sum of the assistance force (torque) $C_{assist}$ output by the assist motor 2 and of the manual force (torque) $C_{steering\ wheel}$ exerted by the driver on the steering wheel 3.

For convenience of the description, but also because the actuating signal $C_{action}$ allows for a more complete perception of the friction phenomenon, as explained above, reference will be preferably made in the following, but without limitation, to said actuating signal $C_{action}$, to describe in detail the (experimental) measurement of the friction $F_{mes\_1}$, $F_{mes\_2}$, ... $F_{mes\_n}$.

More particularly, given the aforementioned hysteresis phenomenon, the friction value that is to be measured will be considered to be equal to half the drop height H/2, that is to say to half the difference between the actuation force value that immediately follows the steering reversal 15 and the actuation force value that immediately precedes the steering reversal 15, that is to say (cf. FIG. 3): $F_{mes\_i}=H/2=\Delta C_{action}/2$.

In practice, in order to access this value, it is possible to first identify a peak start instant $t_{start}$ which corresponds to the instant at which the time derivative of the actuation force signal $\partial C_{action}/\partial t$ (or, if appropriate, the derivative of the motor torque setpoint signal $C_{Mot}$) passes above the variation threshold $S_{peak}$, as well as a peak end instant $t_{end}$ which corresponds to the instant at which said time derivative of the actuation force signal $\partial C_{action}/\partial t$ falls down below said variation threshold $S_{peak}$.

Advantageously, this will allow characterizing accurately the temporal situation (by time stamping) of the steering reversal 15 and the temporal extent (duration) of said steering reversal.

As illustrated in FIG. 3, we will note $d_{peak}=t_{end}-t_{start}$ the peak holding duration which separates the peak end instant $t_{end}$ from the peak start instant $t_{start}$, and during which the time derivative remains larger than the variation threshold $S_{peak}$.

Once the peak start instant and peak end instant are identified, it will be then possible to determine, as illustrated in FIG. 3, what was the value $C_{action}(t1)$, called «the actuation force value anterior to the steering reversal», taken by the actuation force signal at a first reference instant t1, which is equal or anterior to the peak start instant $t_{start}$, as well as the value $C_{action}(t2)$, called «the actuation force value posterior to the steering reversal», taken by the actuation force signal at a second reference instant t2, which is equal or posterior to the peak end instant $t_{end}$, and then assess the friction $F_{mes\_i}$ from the calculation of the difference between the actuation force value posterior to the steering reversal $C_{action}(t2)$ and the actuation force value anterior to the steering reversal $C_{action}(t1)$, that is to say:

$$F_{mes\_i}=\Delta C_{action}/2, \text{ with } \Delta C_{action}=|C_{action}(t2)-C_{action}(t1)|. \quad (1)$$

This friction value $F_{mes\_i}$, plotted on the ordinate axis in FIG. 1, will be associated, on the abscissa axis, to the actuation force value $C_{action\_i}$, as said actuation force value was just before the steering reversal 15, that is to say just before the drop. Hence, we have: $C_{action\_i}=C_{action}(t1)$.

Thus, for a given steering reversal, the following characterization point is acquired: $Pi=(C_{action}(t1); \Delta C_{action}/2)$.

According to a possible implementation, it is possible to choose, arbitrarily, to make the first reference instant t1 coincide with the peak starting instant $t_{start}$ (that is to say set $t1=t_{start}$) and/or, complementarily or alternatively, choose to make the second reference instant t2 coincide with the peak end instant $t_{end}$ (that is to say set $t2=t_{end}$).

Nonetheless, according to a second possibility, the first reference instant t1 is preferably chosen strictly anterior to the peak starting instant $t_{start}$ ($t1<t_{start}$), said first reference instant preceding said peak starting instant with a lead (advance) value δ1 (that is to say: $t1=t_{start}-\delta1$), and/or the second reference instant t2 is chosen strictly posterior to the peak end instant ($t2>t_{end}$), said second reference instant following said peak end instant with a lag value δ2 (that is to say: $t2=t_{end}+\delta2$).

As an indication, the lead value δ1 is preferably comprised between 20 ms and 100 ms, and for example substantially equal to 50 ms (fifty milliseconds).

As an indication, the lag value δ2 is preferably comprised between 20 ms and 100 ms, and for example substantially equal to 50 ms (fifty milliseconds).

In other terms, the time interval [t1; t2], in which the drop height $\Delta C_{action}$ of the considered signal (herein the actuation force signal) is calculated, is preferably enlarged (with reference to the peak holding duration $d_{peak}$), and this preferably at both sides of the derivative peak, both later and earlier.

This enlargement of the measurement interval with reference to the raw interval defined by the peak start and end instants, which enlargement preferably represents at least 10 ms (both earlier and later), and for example preferably 50 ms (both earlier and later: δ1=δ2=50 ms), allows ensuring that the elapsed duration (that is to say t2−t1) between the first reference instant t1 and the second reference instant t2 is effectively larger than or equal to (and if appropriate just larger than) the effective duration of the (complete) drop of the signal corresponding to the steering reversal 15.

When applied for evaluating the friction, this allows ensuring that one covers the entire duration of the signal drop which is imputed to the steering reversal 15, and therefore to friction.

Thus, the method in accordance with the invention allows guaranteeing that the extreme values of the actuation force signal are actually measured, wherein said extreme values correspond to the entire drop height H of said signal, characteristic of the steering reversal, without truncating any portion of said drop.

Furthermore, the lead δ1 and lag δ2 values remain nonetheless relatively lower than predetermined maximum enlargement thresholds, chosen so that the first reference instant t1 and the second reference instant t2 remain in the immediate temporal vicinity of the domain of the transition (of the domain of the drop related to the steering reversal), in "border" domains of the transition, in which border domains the value of the considered signal remains almost constant with reference to the value which is taken by said signal at the transition limit (the evolutions of said value in the bordering domains being for example contained in an amplitude range smaller than or equal to 10%, 5%, or still smaller than or equal to 1% of the drop height).

In fine, the method according to the invention therefore allows measuring a drop height H which substantially corresponds to all the contribution specific to friction and only the contribution specific to friction.

For illustration, in the example of FIG. 2, there is observed a drop height $\Delta C_{action}=|C_{action}(t2)-C_{action}(t1)|$ in the range of 15 000 N−8 200 N=6 800 N, which corresponds to a friction value in the range of 6 800 N/2=3 400 N (namely 3.4 kN).

By retaining as a value representative of the actuation force the value $|C_{action}(t1)|$ of 15 000 N (namely 15 kN) which preceded the drop, the corresponding characterization point, which would contribute to the construction of the correlation law L, would have as coordinates (15 000 N, 3 400 N).

It will be noted incidentally that such a characterization point in this case would be perfectly coherent with the scatter chart already represented in FIG. 1, and effectively very close to the regression line representing the correlation law L in this same FIG. 1. In this case, said characterization point is actually located substantially in the extension of said regression line L, considered beyond the sole domain represented in FIG. 1, and in this case prolonged toward the abscissa (15 kN) corresponding to the abscissa of said characterization point.

Preferably, the series of characterization points contains between at least 5 characterization points, or even at least 10 characterization points $P_1, P_2, \ldots P_n$ on the one hand, and 50, or even 100 characterization points $P_1, P_2, \ldots P_n$, on the other hand, that is to say that we preferably have 5≤n≤100, or possibly 5≤n≤50, or 10≤n≤100, or even 10≤n≤50.

In particular, the objective is to define the size n of the series, that is to say the number of characterization points $P_1, P_2, \ldots P_n$ constitutive of the entire series, by finding a suitable balance between, on the one hand, a sufficiently small size n, which allows economizing the memory and the calculation power, but also limiting the duration necessary for acquiring said series, and on the other hand, a size n sufficiently large for obtaining a representative model.

As an indication, the size n of the series may be chosen so that the (complete) acquisition duration of said series is, in the predictable or noticed conditions of use of the vehicle, comprised substantially between one minute and five minutes, or even ten minutes, and more particularly comprised between one minute and three minutes.

Thus, it is possible to rapidly make available a representative friction model, shortly after start-up of the vehicle, and therefore a reliable estimate of the frictions in all circumstances, including for short trips.

According to a possible variant of implementation, the size n of the series of characterization points may be dynamically modified (adapted) during the life of the steering mechanism 1, and more generally during the life of the vehicle, depending on the detection of certain (predetermined) life situations of the vehicle equipped with said steering mechanism, and more particularly based on the history of certain parameters, or of a combination of certain parameters, such as the speed of the vehicle, the (possibly cumulative) angular amplitude of the maneuvers of the steering wheel, or the magnitude of the steering wheel torque and/or of the assist torque (or, more generally, of the actuation force).

Indeed, it will be understood, for example, that in a driving situation on a sinuous road, at low speed, and involving high-amplitude movements of the steering wheel and relatively high actuation forces, the steering reversals will be numerous, and therefore, the acquisition of the characterization points will be rapid, even for a significant size of the series (for example larger than or equal to 30 points, or even 50 points).

In fact, on a sinuous road (i.e. comprising turns), the inventors have noticed that it was therefore possible to acquire about four to five characterization points per minute.

In such a situation, it will therefore be possible to keep a relatively large sized series, and despite this obtain, and evolve, relatively rapidly, a realistic friction model, which we will ensure, for example, that it will in particular take into consideration the effects of a rapid heating of the steering mechanism (induced in particular by the frictional effects in said steering mechanism and/in the nearby brakes, or even by the thermal losses of the engine serving to propel the vehicle, for example under the effect of the periodic rises of the operating speed related to the resumptions of acceleration).

Conversely, in a regular driving situation on a highway, at high speed, with very few significant corrections of the trajectory and very few changes of the traffic roadway, wherein said corrections or changes apply in addition relatively low actuation forces, the steering reversals, and therefore the acquisitions of characterization points, will be relatively infrequent.

Furthermore, the regularity of the conditions of use in such a driving situation on a highway will make it possible to obtain a realistic friction model with relatively few characterization points, located in the immediate vicinity of said use conditions (typically in a reduced range of actuation forces, corresponding to the actuation forces involved for simply maintaining the alignment of the vehicle in its roadway).

In this second situation, it will therefore be possible to reduce the size of the series, in particular in order to reduce the time required for a complete acquisition (and then for a refresh thereof).

Regardless of the evolutions of the size of the series, the latter will of course remain larger than 2 points, 3 points, and preferably larger than 5 points, or even 10 points, in order to preserve a plurality of characterization points, in a sufficient number to form a sample that is representative of the behavior of the steering mechanism 1 at the considered instant.

In this respect, the size (number of points) of the series, whether at the initial choice or at subsequent adaptations, will preferably remain contained in the aforementioned interval [5; 100], or even [5; 50].

Preferably, the method in accordance with the invention comprises, once the empirical friction model is constructed, a friction estimation step (c), during which is measured, at a considered instant t, the value $C_{action}(t)$ taken by the assistance force (that is to say by the first input variable, herein the actuation force $C_{action}$), and is deduced, by extrapolation, using the correlation law L that is applicable at the considered instant (as is illustrated by the arrows in FIG. 1), an estimate $F_{eval}$ of the value of the friction which affects the steering mechanism 1 at said considered instant.

Advantageously, the knowledge of the correlation law L derived from the series of characterization points allows generalizing the friction model beyond the sole characterization points, and thus estimating the value of the friction in a reliable and realistic way from any value taken by the first variable (by the actuation force), even though said value of the first variable (of the actuation force) is distinct from the points of the scatter chart, that is to say that even though said value does not necessarily correspond strictly to the abscissa of a characterization point belonging to the scatter chart which has served to establish the correlation law L.

In this respect, since the curve of the correlation law L remains permanently surrounded, and therefore guided, by construction, by the experimental characterization points $P_1$, $P_2$, ... $P_n$, such an extrapolation of the model to operating points other than the characterization points, and in particular to operating points located at intermediate abscissas between these characterization points, remains reliable.

As is illustrated in FIGS. 1 and 3, the invention therefore allows, by using the correlation law L constructed from the characterization points, associating afterwards, at any instant t at which it is desired to obtain an information regarding the frictions which affect the steering mechanism, an evaluation $F_{eval}$ of said frictions (the output datum, corresponding to the ordinate of the correlation law) with any stress state of the steering mechanism (the input datum, corresponding to the abscissa of the correlation law), and more particularly with any value, measured or assessed, of the actuation force $C_{action}(t)$.

The evaluation of the friction $F_{eval}$, resulting from the use of the friction model may be exploited afterwards in any management method of the steering mechanism, or more generally in any management method of the vehicle, for example by allowing a compensation of said friction, in order to improve the driving comfort or the tactile feeling of the steering mechanism, as it is perceived by the driver through the steering wheel 3.

Of course, the functions assigned to the method according to the invention may be carried out by adequate calculation modules, and more particularly by an assistance law application module 12, an acquisition module (for acquiring characterization points) 16, a model construction module (a module for calculating the correlation law) 17, and a friction evaluation module 18 (applying the defined correlation law L to evaluate, at any time and for any value of the actuation force $C_{action}(t)$, the corresponding friction $F_{eval}(t)$).

Each of the aforementioned modules may be formed by an electronic circuit, an electronic board, a calculator (computer), a programmable controller, or any other equivalent device.

Each of the aforementioned modules may present a physical control structure, related to the wiring arrangement of its electronic components, and/or, preferably, a virtual control structure, defined by computer programming.

Of course, the invention also concerns, as such, any data medium readable by a computer and containing code elements of a computer program allowing executing the method in accordance with the invention when said medium is read by a computer.

The invention also concerns a power steering system comprising a power steering mechanism 1 controlled by a management module including all or part of the aforementioned modules, and therefore capable of implementing the method according to the invention.

It further concerns a motor vehicle, in particular with steered, and possibly driving wheels 9, 10, equipped with such a power steering system.

Finally, it will be noted that the method in accordance with the invention, which exploits signals generally available within the power steering systems, may be easily generalized to all power steering systems, including retrofitting on numerous already existing power steering systems, simply by reprogramming their calculator.

Of course, the invention is by no way limited to the sole variants described in the preceding, those skilled in the art being in particular capable of freely isolating or combining together either of the aforementioned features, or even substituting said features with equivalents thereof.

The invention claimed is:

1. A method for evaluating frictions in a power steering mechanism equipped with an assist motor configured to provide an assistance force for maneuvering the power steering mechanism, the method comprising:
    acquiring a series of characterization points by measuring friction values for the power steering mechanism, the friction values corresponding to several different values representative of the assistance force taken successively during operation of the power steering mechanism, each of the acquired series of characterization points being distinct from the other characterization points and associating a said measured friction value to a said measured value representative of the assistance force; and
    constructing an empirical friction model from a scatter chart formed by the series of characterization points by establishing a correlation law between the characterization points constituting the series.

2. The method according to claim 1, wherein the acquisition step and the model construction step are refreshed in an iterative manner during the operation of the power steering mechanism so that the correlation law is redefined as new characterization points are acquired.

3. The method according to claim 1, wherein the acquisition of the series of characterization points is a rolling acquisition so that, once the series has reached a predetermined maximum size, acquiring one or several new characterization point(s) and adding the most recent characterization point(s) to the series causes withdrawing a number of the earliest characterization point(s) from the series corresponding to the number of most recent characterization point(s) added to the series.

4. The method according to claim 1, wherein the series contains between 5 characterization points and 100 characterization points.

5. The method according to claim 4, wherein the series contains between 5 characterization points and 50 characterization points.

6. The method according to claim 4, wherein the series contains between 10 characterization points and 100 characterization points.

7. The method according to claim 4, wherein the series contains between 10 characterization points and 50 characterization points.

8. The method according to claim 1, wherein the size of the series of characterization points is dynamically modified during the service life of the power steering mechanism, depending on detection of certain predetermined life situations of the vehicle equipped with the power steering mechanism.

9. The method according to claim 1, wherein the established correlation law is an interpolation curve or a regression curve with reference to the series of characterization points.

10. The method according to claim 1, wherein the correlation law is obtained by linear regression on the series of characterization points.

11. The method according to claim 1, wherein the measured value representative of the assistance force is chosen among: a value of a motor torque setpoint which is applied to the assist motor, a measured value of an electromagnetic assist torque that is actually exerted by an output shaft of the assist motor, and a measured value of a total actuation torque which corresponds to a sum of (1) the assist torque output by the assist motor and (2) steering wheel torque which is exerted by a driver on a steering wheel of the vehicle.

12. The method according to claim 1, wherein the characterization points are acquired during steering reversals, and in that acquisition, the measurement of the friction values of the characterization points is obtained from a drop height of (i) a signal representative of the assistance force output by the assist motor or, (ii) a signal representative of a total actuation force corresponding to a sum of the assistance force output by the assist motor and a manual force exerted by a driver on a steering wheel of the vehicle.

13. The method according to claim 1, further comprising a friction estimation step, which comprises:
    measuring, at a considered instant, the value taken by the assistance force, and
    deducing, by extrapolation and by using the correlation law that is applicable at the considered instant, an estimate of the value of the friction which affects the power steering mechanism at the considered instant.

* * * * *